United States Patent [19]

Ishiguro

[11] 4,006,976
[45] Feb. 8, 1977

[54] FADE-IN AND FADE-OUT DEVICE OF A CINECAMERA

[75] Inventor: Yasuo Ishiguro, Tokyo, Japan

[73] Assignee: Copal Company Limited, Tokyo, Japan

[22] Filed: July 16, 1975

[21] Appl. No.: 596,415

[30] Foreign Application Priority Data

July 19, 1974 Japan .............................. 49-82265
July 19, 1974 Japan .............................. 49-82266
July 19, 1974 Japan .............................. 49-82267

[52] U.S. Cl. .................................... 352/91 C
[51] Int. Cl.² ...................................... G03B 21/36
[58] Field of Search ............... 352/91 R, 91 C, 91 S

[56] References Cited
UNITED STATES PATENTS 3,419,325 12/1968 Mayr ........................... 352/91 S
3,517,990 6/1970 McGillion .................... 352/91 C
3,701,594 10/1972 Keiner ......................... 352/91 S

*Primary Examiner*—Monroe H. Hayes

[57] ABSTRACT

Fade-in and fade-out device used in a cinecamera having an automatic exposure control circuit including a photoelectric element receiving light from scene through the diaphragm of the taking lens for generating an output voltage indicative of the scene brightness, a capacitor for generating an output voltage used as a reference voltage and a servoamplifier for comparing the output voltages of the photoelectric element and the capacitor so that an output, the sense of which is dependent on the values of the outputs of the photoelectric element and the capacitor and which is continuingly generated until both the outputs of the photoelectric element and the capacitor become equal to each other, is supplied to an actuating means for the diaphragm of the taking lens so as to control the same for the proper exposure. The fade-in and the fade-out device comprises a constant current charging circuit for selectively and additionally charging the capacitor with a constant current so as to increase the output voltage linearly to the source voltage thereby varying the diaphragm from the proper exposure aperture to the closed position so as to effect the fade-out, and a constant current discharging circuit for selectively discharging the capacitor with a constant current so as to decrease the output voltage linearly from the source voltage to the reference voltage thereby varying the diaphragm from the closed position to the proper exposure aperture so as to effect the fade-in. The constant current charging and discharging circuits permit the time period for the fade-in and the fade-out to be independent from the aperture of the diaphragm at the proper exposure while the exposure at the midpoint of the fade-in and the fade-out is made equal to each other.

9 Claims, 19 Drawing Figures

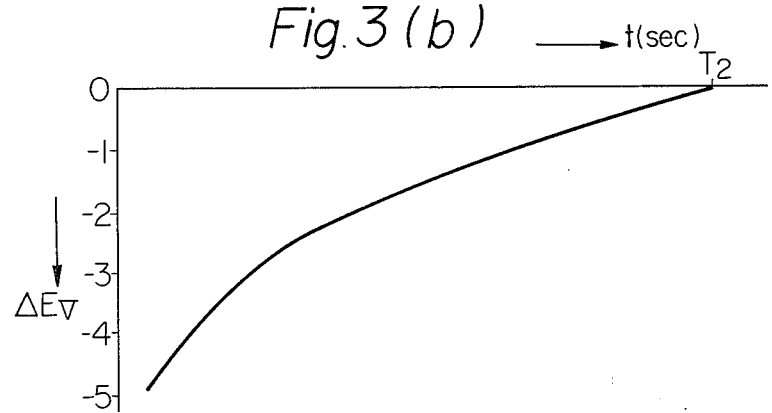
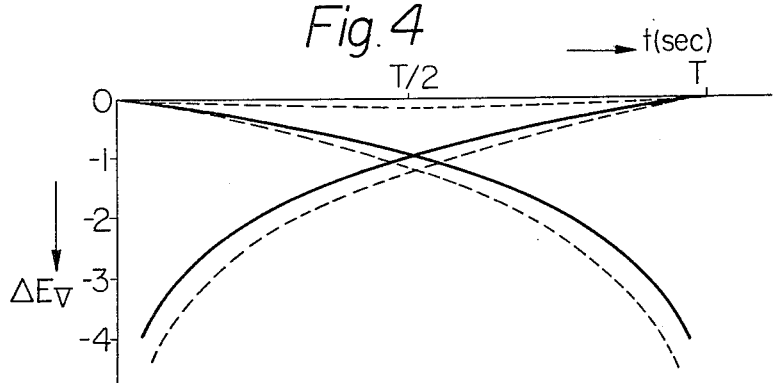
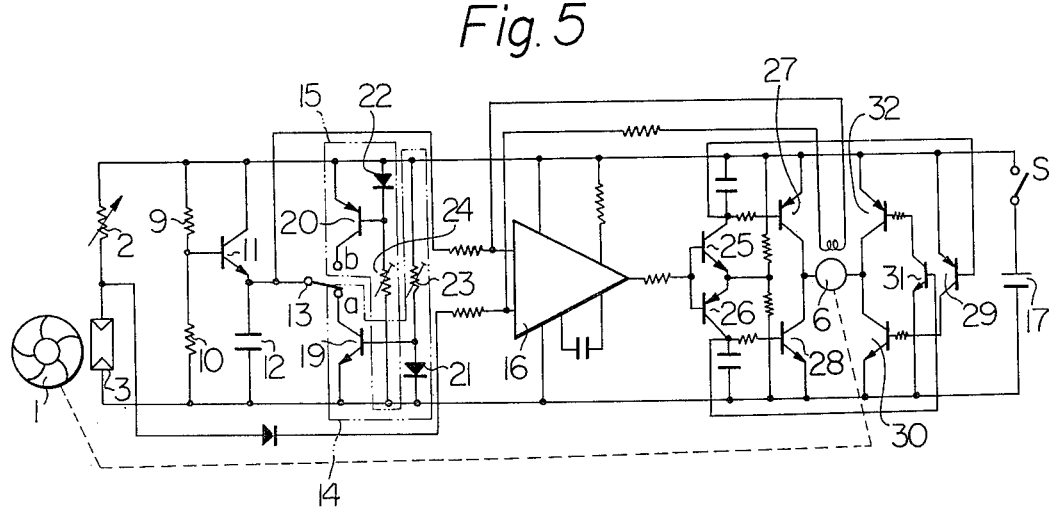

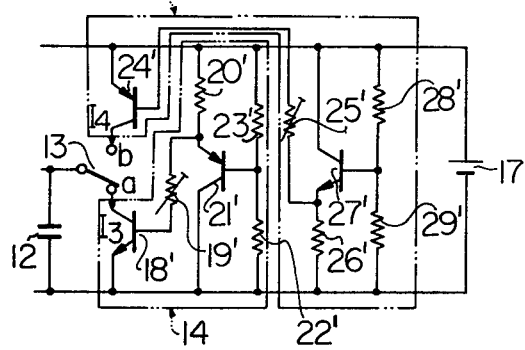
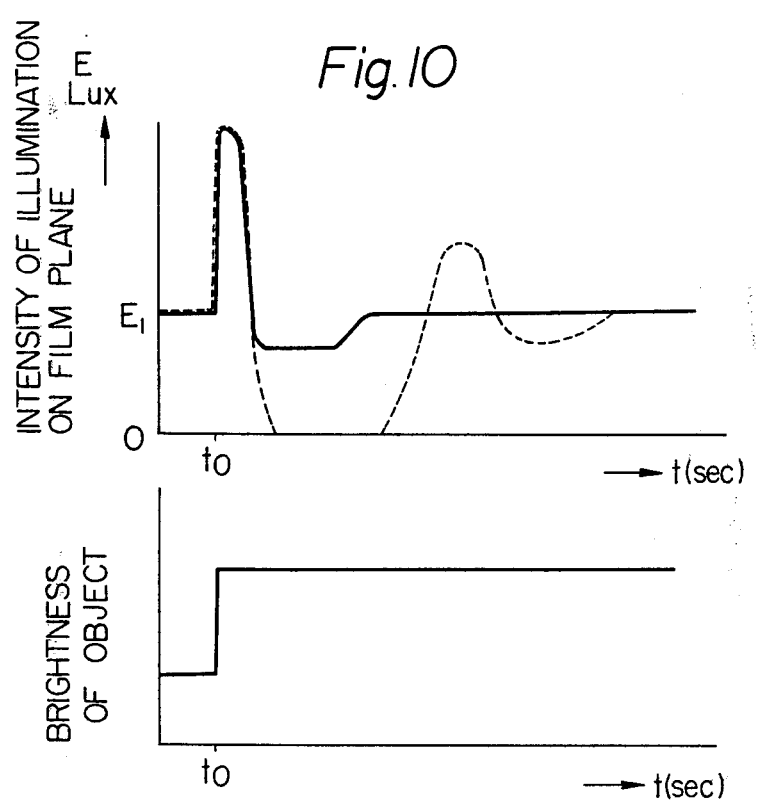

FADE-IN AND FADE-OUT DEVICE OF A CINECAMERA

BACKGROUND OF THE INVENTION

The present invention relates to a fade-in and fade-out device of a cinecamera having an automatic exposure control circuit, and more particularly, to a fade-in and fade-out device of the type described above wherein the exposure at the midpoint of the time period of the fade-in can be made equal to that at the midpoint of the time period of the fade-out.

Fade-in is a technique in which the film is so processed that the projected scene of the film is dark at the beginning but gradually increases brightness to the proper exposure while fade-out is a technique in which the brightness of the projected scene is gradually reduced from the proper exposure to the dark.

The overlap is a technique in which the film is so processed that it is rewound after the fade-out operation to the extent that the film is subjected to the fade-out and the rewound portion of the film is newly subjected to the fade-in so that the preceding scene gradually vanishes while at the same time the succeeding scene gradually appears in over-lapping relation. This gives the scene a fresh and interesting feeling.

Heretofore, as the measure for continuously varying the exposure in the operation of the cinecamera, the following techniques have been practiced.

One technique utilizes fader means in which two polarizing filters are used in combination, one of which is fixedly mounted in front of the taking lens of the cinecamera while the other filter is rotated so that the quantity of light passing through the two filters is made adjustable.

This method had disadvantages that the quantity of light available on the film plane in the cinecamera is already reduced to less than half of the incident light, because the fader means is mounted in front of the taking lens. Further, in case of a cinecamera having TTL type automatic exposure control circuit, the diaphragm must be fixedly set immediately prior to the fading operation, because otherwise the diaphragm is actuated by the automatic exposure control circuit, thereby requiring additional operation. Since the fader means must be mounted in front of the taking lens and one of the filters must be rotated automatically, the cinecamera is necessarily made bulky thereby rendering the manipulation thereof to be difficult.

Another technique utilizes the adjustment of the opening angle of the shutter blade of the cinecamera. This method obviates the above described disadvantages, however, the complicated mechanism is required thereby making the cost high. Therefore, this method can not be used only in some high class cinecameras.

Further technique utilizes the diaphragm of the taking lens per se. In this method, a time constant circuit consisting of a capacitor and a resistor is provided in a portion of the automatic exposure control circuit so that the diaphragm is continuously adjusted by the charging or discharging current of the capacitor. This method is inexpensive in comparison with the previously described methods, however, it has advantages in that the time period required for the fading varies depending upon the size of the aperture of the diaphragm at the proper exposure, and the time period for the fade-in and that of the fade-out might be different although it is indispensable to make the time for the fade-in equal to that for the fade-out in overlap operation, and, further, the exposure at the midpoint of the fade-out of the preceding scene might be different from that of the fade-in of the succeeding scene in the overlap operation which deteriorates the quality of the fading operation.

The present invention aims at avoiding the above described disadvantages of the prior art fade-in and fade-out device.

SUMMARY OF THE INVENTION

An object of the present invention is to provide a novel and useful fade-in and fade-out device of a cinecamera which avoids the above described disadvantages of the prior art fade-in and fade-out device.

Another object is to provide a fade-in and fade-out device of the type described above which utilizes the diaphragm of the taking lens of the cinecamera as the fade-in and fade-out device and which is simple, compact and inexpensive in construction and accurate in operation.

A still further object is to provide a fade-in and fade-out device of the type described above in which the time required for the fade-in and the fade-out is made independent from the size of the aperture of the diaphragm at the proper exposure.

A further object is to provide a fade-in and fade-out device of the type described above in which the exposure at the midpoint of the fade-in is made equal to that of the fade-out.

Another object is to provide a fade-in and fade-out device of the type described above in which overlap operation is made possible even though the film speed in the fade-in operation is made different from that in the fade-out operation.

Other object is to provide a fade-in and fade-out device of the type described above in which the time for the fade-in operation as well as for the fade-out operation is made independent regardless of the variation in the voltage of the electric source of the device.

Another object is to provide a fade-in and fade-out device of the type described above in which the stop down limiting means for the diaphragm normally required for preventing the excessive variation in the aperture of the diaphragm controlled by the automatic exposure control circuit during the rapid change in scene brightness is released during the fade-in and fade-out operation so that the fade-out insures the complete darkness at the end of the fade-out while the fade-in can be commenced from the complete darkness.

In order to achieve the above objects, the present invention is characterized by the provision of a fade-in and fade-out device of a cinecamera having an automatic exposure control circuit including an electric source, a photoelectric element arranged behind a variable diaphragm of the taking lens of the cinecamera or a variable diaphragm coupled with the diaphragm of the taking lens for receiving light from the scene therethrough so as to generate an output voltage indicative of the scene brightness, a reference voltage circuit having a capacitor adapted to be charged by the electric source so that the output voltage thereof is used as a reference voltage, a servoamplifier with its inputs connected to the output voltage of the photoelectric element and the output of the capacitor, respectively, so as to continue to generate an output until the output voltages of the photoelectric element and the capacitor are made equal to each other, the sense of the output of the servoamplifier being determined depending upon which of the output of the photoelectric element or the capacitor is greater than the other, and an actuating means connected to the output of the servoamplifier and operatively coupled with the variable diaphragm thereby adjusting the variable diaphragm of the taking lens for the proper exposure. The device is characterized by a constant current charging circuit connected to the plug terminal of the electric source and selectively connectable to the capacitor for additionally charging the same with a constant current in excess of the reference voltage so as to increase the output voltage thereof linearly, a constant current discharging circuit connected to the minus terminal of the electric source and selectively connectable to the capacitor for discharging the same with a constant current so as to decrease the output voltage thereof linearly to the reference voltage, and switching means for alternately connecting the capacitor to the constant current charging circuit or the constant current discharging circuit, thereby permitting the fade-in and the fade-out to be effected by the variable diaphragm of the taking lens.

In a preferred embodiment, the actuating means may be made a servomotor which adjust the diaphragm in accordance with the output of the servoamplifier.

In accordance with a feature of the present invention, there are provided switching means for varying the film speed and adjusting means coupled with the switching means for varying the capacity of the capacitor in inverse proportion to the variation in the film speed thereby permitting the time required for each of the fade-in and fade-out during the overlap to be varied in inverse proportion to the variation in the film speed so that the number of frames in the film used in the fade-out and the fade-in in the overlap can be made equal to each other regardless of the film speed during the fade-in and the fade-out.

In accordance with another feature of the present invention there are provided switching means for varying the film speed and adjusting means coupled with the switching means for varying the charging current supplied to the capacitor by the constant current charging circuit and the discharging current discharged from the capacitor through the constant current discharging circuit in proportion to the variation in the film speed thereby permitting the time required for each of the fade-in and the fade-out during the overlap to be varied in inverse proportion to the variation in the film speed so that the number of frames in the film used in the fade-out and the fade-in in the overlap can be made equal to each other regardless of the film speed during the fade-in and the fade-out.

In accordance with a further feature of the present invention, there is provided adjusting means for varying the constant current of the constant current charging circuit and the constant current discharging circuit in the proportion to the variation in the voltage of the electric source thereby permitting the time required for each of the fade-in and the fade-out to be independent from the variation in the voltage of the electric source.

In the present invention, there are provided stop down limiting means for limiting the stop down of the diaphragm of the taking lens to a predetermined aperture, the stop down limiting means being capable of being released for allowing the diaphragm of the taking lens to be completely stopped out, and releasing means operatively coupled with the switching means for releasing the stop down limiting means in response to the actuation of the switching means for the fade-in and the fade-out thereby permitting the diaphragm of the taking lens to be completely stopped out during the fade-in and the fade-out.

Other objects and features of the present invention will be apparent from the following description of the preferred embodiments of the present invention when read in conjunction with the accompanying drawings.

BRIEF DESCRIPTION OF THE DRAWINGS

FIG. 4 is a diagram showing the variation in intensity of illumination with respect to the time during the overlap operation in accordance with the present invention;

FIG. 5 is a diagram showing an embodiment of the circuit constructed in accordance with the present invention;

FIG. 9 is a diagram showing a part of another embodiment of the circuit of the present invention in which compensation means for variation in source voltage is provided so as to render the time required for the fade-in and the fade-out to be independent from the variation in source voltage;

FIG. 10 is a diagram showing the variation in intensity of illumination on the film plane in an automatic exposure control system when the scene brightness or the brightness of the object is rapidly varied;

DETAILED DESCRIPTION OF THE PREFERRED EMBODIMENTS

Figure 1:
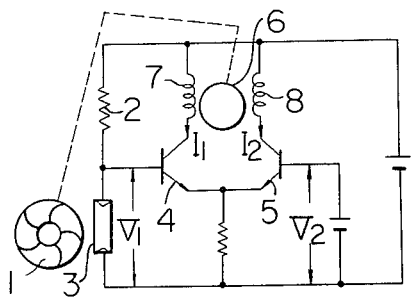
FIG. 1 is a diagram showing a known basic circuit of an automatic exposure control circuit using a servomotor for controlling the diaphragm of a cinecamera.

Referring to FIG. 1 showing a known basic automatic exposure control circuit using a servomotor for adjusting the diaphragm, a resistor 2 and a photoelectric element 3 arranged behind the diaphragm 1 of a taking lens (not shown) are connected in series to the electric source so as to form an object brightness detecting circuit.

The output voltage $V_1$ of the photoelectric element 3 is compared with a reference voltage $V_2$ provided by another electric source by means of a differential amplifier consisting of transistors 4 and 5 as shown. The collectors of the transistors 4, 5 are connected to a diaphragm closing coil 7 and a diaphragm opening coil 8 of the servomotor 6, respectively. Thus, when the voltage $V_1$ of the photoelectric element is greater than the reference voltage $V_2$, the current $I_1$ flowing through the coil 7 is made greater than the current $I_2$ flowing through the coil 8 so that the servomotor 6 is rotated by the difference between the effect of the coils 7, 8 thereby closing the diaphragm 1 operatively coupled with the servomotor 6 so as to increase the resistance of the photoelectric element 3 and thus the output voltage $V_1$. When the currents $I_1$ and $I_2$ are made equal or when the increasing voltage $V_1$ is made equal to the reference voltage $V_2$, the servomotor 6 is stopped so that the diaphragm 1 is held at the proper exposure condition. This also applies in case the voltage $V_1$ is lower than the reference voltage $V_2$. It is apparent that the servomotor 6 may be replaced by a galvano meter.

The present invention provides a fade-in and fade-out device in the above described automatic exposure control system using a servomotor (or a galvanometer) in which the diaphragm per se is used in the fade-in and fade-out operation. This is also achieved by continuously varying the reference voltage from the set value $V_2$ up to the voltage of the electric source so as to stop out the diaphragm or fade-out and, after the stop out, by varying the reference voltage which has been raised to the source voltage down to the set value $V_2$ so as to open the diaphragm to again achieve the proper exposure or fade in.

Figure 2:
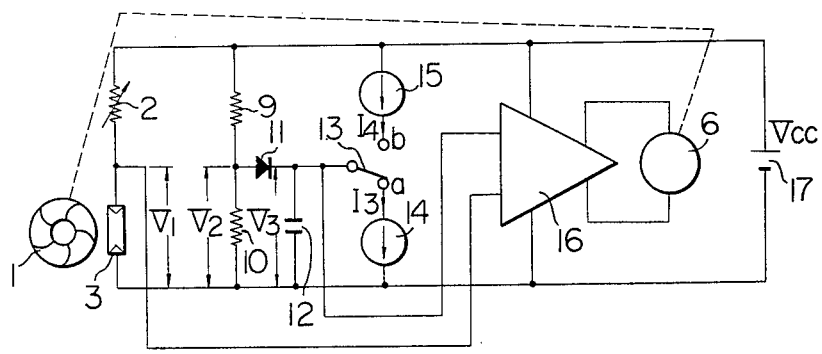
FIG. 2 is a diagram showing the basic circuit of the present invention.

FIG. 2 shows the basic circuit of the present invention for effecting the above described function. In like manner as in FIG. 1, the resistor 2 and the photoelectric element 3 located behind the diaphragm 1 of the taking lens (not shown) connected in series to the electric source 17 form the object or scene brightness detecting circuit. A resistor 9 and a resistor 10 are connected in series to the electric source 17 so as to form a voltage divider which provides the reference voltage $V_2$. The resistor 2 is made variable so as to introduce informations of the film speed or number of frames of the film processed in a unit time or the film sensitivity into the circuit. The servomotor 6 coupled with the diaphragm 1 is connected to the output of a servoamplifier 16 so as to be driven thereby for adjusting the diaphragm 1.

One end of a capacitor 12 is connected to the junction between the resistor 9 and the resistor 10 through a diode 11 which prevents the discharge of the capacitor 12 through the resistor 10. The other end of the capacitor 12 is connected to the minus terminal of the electric source 17 so that the voltage $V_3$ of the capacitor 12 is normally held at the reference voltage $V_2$ by being charged by the voltage divider consisting of the resistors 9, 10.

The output voltage $V_3$ of the capacitor 12 and the output voltage $V_1$ of the photoelectric element 3 are connected to the inputs of the servoamplifier 16 so that the voltage $V_1$ and the voltage $V_3$ which is normally held at the reference voltage $V_2$ are compared in the servoamplifier 16 thereby driving the servomotor 6 until proper exposure is obtained by the adjustment of the diaphragm 1 as previously described.

In accordance with the characteristic feature of the present invention, one end of a constant current charging circuit 15 is connected to the plus terminal of the electric source 17 while the other end thereof is connected to a stationary contact $b$ of a change-over switch 13 the movable contact of which is connected to the above described one end of the capacitor 12, and one end of a constant current discharging circuit 14 is connected to a stationary contact a of the switch 13 while the other end thereof is connected to the minus terminal of the electric source 17. Thus, when the switch 13 is switched to the contact $b$, the capacitor 12 is charged through the constant current charging circuit 15 with a constant current $I_4$ so that the output voltage $V_3$ of the capacitor 12 is raised in excess of the reference voltage $V_2$ to the source voltage Vcc of the electric source thereby closing the diaphragm 1 and increasing the resistance of the photoelectric element 3 infinitely to effect the fade-out. After the fade-out, when the switch 13 is switched to the contact a, the capacitor 12 which has been charged to the source voltage Vcc so as to close the diaphragm 3 is discharged through the constant current discharging circuit 14 with a constant current $I_3$ to the reference voltage $V_2$ so that the diaphragm 3 is opened to restore the proper exposure to effect the fade-in.

The operation of the circuit described above will be described more in detail.

When the switch 13 is connected to the contact a and when conditions are so set that the charging capacity of the voltage divider consisting of the resistors 9, 10 is far greater than the discharging capacity of the constant current discharging circuit 14, the output voltage $V_3$ of the capacitor 12 is held at the reference voltage $V_2$, the constant current $I_3$ being assumed to be small and the voltage drop in the forward direction of the diode 11 being assumed to be negligible.

Under such conditions, the diaphragm 3 is held at the proper exposure wherein the output voltage $V_1$ is held equal to the reference voltage $V_2$.

In effecting the fade-out, the switch 13 is switched to the contact $b$. Then, the constant current discharging circuit 14 is disconnected from the capacitor 12 and the constant current charging circuit 15 is connected to the capacitor 12 so as to additionally charge the capacitor 12 with the constant current $I_4$ so that the output voltage $V_3$ is raised in excess of the reference voltage $V_2$. In this case, the current $I_4$ is prevented from flowing through the resistor 10 by the provision of the diode 11.

The output voltage $V_3$ of the capacitor 12 is represented by the following equation in terms of the constant current $I_4$ and the time $t$:

$$V_3 = V_2 + I4/C \, t$$

where C is the capacity of the capacitor 12.

Since the servomotor 6 energized by the servoamplifier 16 operates so as to balance the voltage $V_1$ to be equal to the voltage $V_3$, the resistance $R_p$ of the photoelectric element 3 varies as follows with respect to the time:

$$V_1 = \frac{R_p}{P_p + R_3} \cdot Vcc = V_2 + \frac{I4}{C} t = V_3$$

-continued $$R_p = \frac{R_3}{\frac{1}{\frac{V_2}{Vcc} + \frac{I_4}{C\,Vcc}} - 1}$$

where $R_3$ is the resistance of the photoelectric element 3.

When $V_3 = Vcc$ is reached, i.e., when $$t = \frac{Vcc - V_2}{I_4} C = \frac{Vcc}{I_4}(1-K)C = T_1$$

is reached, where $V_2 = K\,Vcc$, the resistance of the photoelectric element 3 is made infinite and the diaphragm 3 is completely closed to effect the fade-out.

When the fade-in is to be effected after the fade-out has been effected as described above, the switch 13 is switched to the contact $a$. Then, the output voltage $V_3$ which has been held at the source voltage Vcc is decreased by the constant discharging current $I_3$ of the constant discharging circuit 14, and the voltage $V_3$ of the capacitor 12 varies following the equation $$V_3 = Vcc - I3/C\,t$$

Since the servoamplifier 16 and the servomotor 6 operate so as to make $V_1 = V_3$, the resistane $R_p$ of the photoelectric element 3 varies so as to following the equations:

$$V_1 = \frac{R_p}{R_p + R_3} Vcc = Vcc - \frac{I_3}{C}t$$

$$R_p = \left(\frac{C}{I_3}\frac{Vcc}{t} - 1\right)R_3$$

The voltage $V_3$ decreases to the reference voltage $V_2$, and, since the charging capacity of the voltage divider consisting of the resistors 9 and 10 is far greater than the discharging capacity of the circuit 14 as previously described, the voltage $V_3$ will not be lowered below the reference voltage $V_2$ and is held at the reference voltage $V_2$ so that the proper exposure is again restored to effect the fade-in.

The time required for the fade-in is $$t = \frac{Vcc - V_2}{I_3} C = \frac{Vcc}{I_3}(1-K)C = T_2$$

Figure 3A:
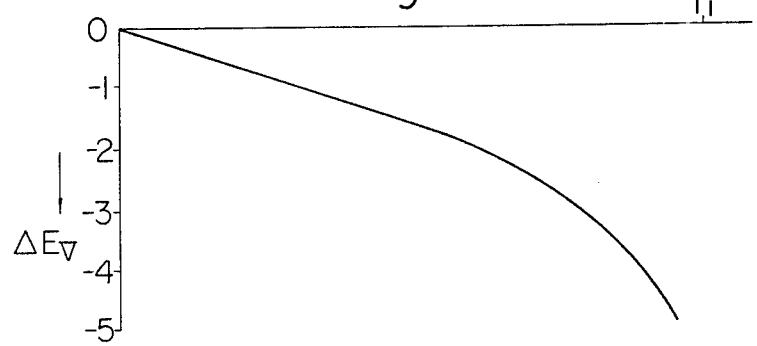
FIG. 3(a) and (b) are diagrams showing the variation in intensity of illumination on the film plane in the cinecamera with respect to the time during the fade-out operation and the fade-in operation obtained by the present invention, respectively.

FIG. 3(a) shows the variation in the intensity of illumination on the film plane during the fade-out, while FIG. 3(b) shows the variation in the intensity of illumination on the film plane during the fade-in. In this graphs, the abscissa shows the time t lapsed, while the ordinate shows the variation in exposure from the proper exposure in terms of exposure value Ev. Since the servomechanism is employed in the present invention, the characteristics of the variation in illumination on the film plane are independent from the scene brightness, i.e., the aperture of the diaphragm or the interchange of films having different sensitivity and are held constant.

In effecting the overlap operation, the switch 13 is switched from the contact a to the contact b at the end of the preceding scene to effect the fade-out and when the diaphragm 1 has been completely closed, the driving of the film feed is stopped and the film is rewound to the extent in which the fade-out is effected on the film, and the film feeding is commenced simultaneously with the switching of the switch 13 from the contact b to the contact a so as to effect the fade-in for the time period required for the fade-out. After the fade-in is completed and the diaphragm 1 is restored to the proper exposure condition, the normal operation is effected.

The time $T_1$ required for the fade-out and the time $T_2$ required for the fade-in can be made equal when the current $I_3$ is adjusted so as to be equal to the current $I_4$ by appropriately setting the constant current circuits 14, 15. When the currents $I_3$, $I_4$ are adjusted optionally by the operator, the time required for the overlap can be selected as desired.

The exposure at the midpoint of the fade-in and the fade-out is represented by the following expressions:

In fade-out:

$$V_3 = V_2 + \frac{1}{C} \frac{T}{2}$$

$$= \frac{k-1}{2} Vcc$$

In fade-in:

$$V_3 = Vcc - \frac{1}{C} \frac{T}{2}$$

$$= \frac{K-1}{2} Vcc$$

where:
$T_1 = T_2 = T$
$I_3 = I_4 = I$

The above expressions show that the exposure at the midpoint of the fade-out as well as the fade-in is equal to each other. This makes the quality of the overlap to be superior in comparison with the prior art in which the exposure at the midpoint of the fade-out could not be made equal to the exposure at the midpoint of the fade-in.

FIG. 4 shows the variation in illumination on the film plane during the overlap. The curves of solid line show the illumination characteristics for the film in the fade-out, the fade-in and the overlap when $K = 0.77$ and the value of $\gamma$ of the photoelectric element 3 is selected to be 1.2, while the curves of broken line show those when $K = 0.77$ and the $\gamma$ is selected to be 1. In the curves shown in broken line, the exposure at the midpoint $T/2$ in the overlap is by 0.2 Er lower than the ideal condition. However, such a deviation is negligible for the practical use.

FIG. 5 shows an embodiment of the circuit of the present invention.

The circuit of FIG. 5 is substantially similar to that of FIG. 2 but it shows the constant current charging circuit 15 and the constant current discharging circuit 14 in more detail.

The constant current discharging circuit 14 shown in FIG. 5 comprises a transistor 19, a diode 21 and a variable resistor 23 connected as shown. The constant current discharging circuit 15 comprises a transistor 20, a diode 22 and a variable resistor 24 connected as shown. A control circuit for the servomotor 6 comprises transistors 25, 26 having their bases connected to the servoamplifier 16, a transistor 27 having its base connected to the collector of the transistor 25 and its collector connected to one terminal of the servomotor 6, a transistor 28 having its base connected to the collector of the transistor 26 and its collector connected to the above described one terminal of the servomotor 6, a transistor 29 having its base connected to the collector of the transistor 25 and its collector connected to the base of a transistor 30. The collector of the latter is connected to the other terminal of the servomotor 6 while the emitter of the transistor 30 is connected to the minus terminal of the electric source 17, a transistor 31 having its base connected to the collector of the transistor 26 and its collector connected to the base of a transistor 32 the collector of which is connected to the above described other terminal of the servomotor 6 while the emitter of the transistor 32 is connected to the plus terminal of the electric source 17. The emitters of the transistors 25, 26 are connected to a voltage divider consisting of resistors connected in series to the electric source 17. The emitter of the transistor 29 is connected to the plug terminal of the electric source 17 while the emitter of the transistor 31 is connected to the minus terminal of the electric source 17. The base-emitter of a transistor 11' is connected between the junction of the resistors 9, 10 forming the voltage divider for generating the reference voltage $V_2$ and the capacitor 12, the collector of the transistor 11' being connected to the plus terminal of the electric source 17 thereby normally charging the capacitor 12 so that the output voltage $V_3$ is held at the reference voltage $V_2$.

In operation, the servoamplifier 16 generates an output, the sense and the amount of which depend upon the difference between the voltage $V_1$ and the voltage $V_3$, and the output of the servoamplifier 16 is supplied to the bases of the transistors 25, 26 so that either one of the transistors 25, 26 is made conductive depending upon the difference between the voltage $V_1$ and the voltage $V_3$ thereby rendering either one of the transistors 27, 28 to be conductive while the corresponding one of the transistors 29, 31 is made conductive depending upon which of the transistors 25, 26 is rendered to be conductive. Therefore, either one of the transistors 30 and 32 is made conductive depending upon which of the transistors 29 and 31 is made conductive. Thus, the servomotor 6 is actuated in either of the opposite two senses so as to adjust the diaphragm for the proper exposure until the voltage $V_1$ is made equal to the voltage $V_3$ which is held at the reference voltage $V_2$.

The fade-in and the fade-out as well as the overlap can be carried out by the circuit of FIG. 5 in the same manner as in the case of circuit of FIG. 2.

In accordance with a further feature of the present invention, compensating means is provided which enables the overlap operation to be carried out even though the film speed is changed in the fade-in from the film speed during the fade-out.

This is achieved by varying the time $T_1$ and $T_2$ required for the fade-out and the fade-in inverse proportion to the variation in the film speed.

Figure 6A:
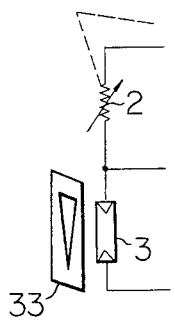
FIGS. 6(a), (b), (c) and (d) are diagrams showing various means for introducing the film sensitivity and the film speed into the circuit of FIG. 5.

FIGS. 6(a), (b), (c) and (d) show the means for introducing the informations relating to the film sensitivity and the film speed. In FIG. 6(a), the resistor 2 is adjusted in coupled relation to the film speed switching means, while the adjusting means 33 such as a tear drop type diaphragm and a neutral density filter located in front of the diaphragm 3 is adjusted in coupled relation to the film sensitivity adjusting means.

Figure 6B:
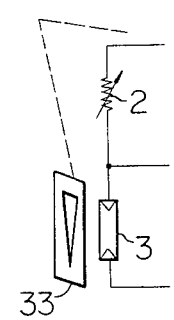

FIG. 6(b) shows the adjusting means 33 to be used in coupled relation to the film speed switching means while the variable resistor 2 is used in coupled relation to the film sensitivity adjusting means.

Figure 6C:
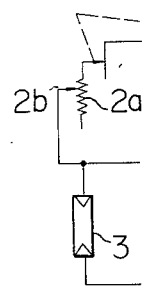

FIG. 6(c) shows alternative form of the variable resistor consisting of resistor element 2a and a brush 2b, the resistor element 2a being adjusted in coupled relation to the film speed switching means while the brush 2b is adjusted in coupled relation to the film sensitivity adjusting means.

Figure 6D:
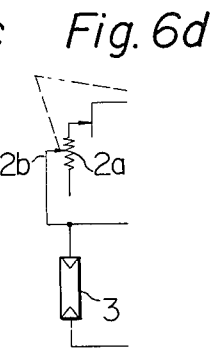

FIG. 6(d) shows the resistor element 2a adjusted in coupled relation to the film sensitivity adjusting means while the brush 2b is adjusted in coupled relation to the film speed switching means. Thus, when means is provided in the circuit which is coupled with the variable resistor 2 in FIG. 6(a) or the adjusting means 33 in FIG. 6(b) or the resistor element 2a in FIG. 6(c) or the brush 2b in FIG. 6(d) so as to vary the time $T_1$ and the Time $T_2$ in inverse proportion to the switching of the film speed or the variation in the film speed ratio, then the overlap operation can be carried out even though the film speed in the fade-in is varied from that in the fade-out.

Figure 7A:
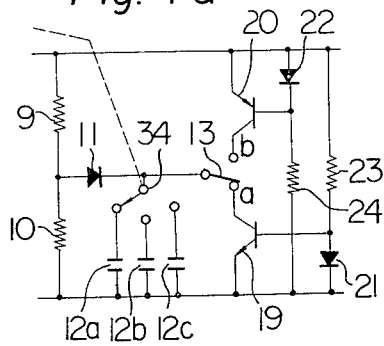
FIGS. 7(a) and (b) are diagrams showing various embodiments of compensating circuit for the film speed in accordance with the present invention.

FIG. 7(a) shows an embodiment of the present invention for effecting the above described coupled operation so as to enable the overlap. In FIG. 7(a) a switch 34 is provided between the junction between the resistors 9, 10 and the switch 13. A plurality of capacitors 12a, 12b, 12c — having their capacity inversely proportional to the respective film speeds are provided in place of the capacitor 12 in FIG. 5 and one of them is selectively connected by the switching of the switch 34 between the junction between the resistors 9, 10 and the minus terminal of the electric source 17. The switch 34 is operatively coupled with the resistor 2 in FIG. 6(a) or the adjusting means 33 in FIG. 6(b) or the resistor element 2a in FIG. 6(c) or the brush 2b in FIG. 6(d) as shown by a broken line so that the time $T_1$ and $T_2$ can be varied in inverse proportion to the variation in the film speed.

Figure 7B:
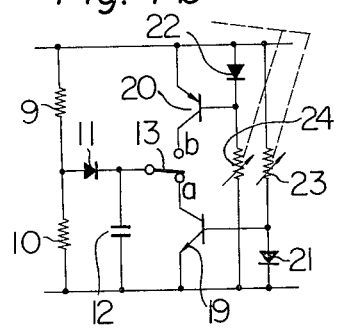

FIG. 7(b) shows an alternative form of FIG. 7(a) in which the capacitors 12a, 12b, 12c — are substituted by the capacitor 12 but the resistors 24, 23 in FIG. 5 are operatively coupled with the resistor 2, adjusting means 33, resistor element 2a or the brush 2b shown in FIGS. 6(a), (b), (c) or (d) as shown by the broken line so that the resistance each of the resistors 24, 23 can be varied in coupled relation to the switching of the film speed so as to vary the constant currents $I_3$ and $I_4$ of the constant current discharging circuit 14 and the constant current charging circuit 15 in proportion to the variation in the film speed. This also provides the time $T_1$ and $T_2$ inversely proportional to the variation in the film speed.

It is apparent that the photoelectric element 3 may be a photoconductive element or a photovoltaic element.

As described above, since the servo mechanism is operating during the fading operation and the voltage $V_3$ utilized as the reference voltage $V_2$ in the normal operation of the cinecamera is varied linearly by the provision of the constant current circuits 15, 14 from the reference voltage $V_2$ up the source voltage Vcc and down therefrom to the reference voltage $V_2$, the aperture of the diaphragm 3 at the proper exposure is made independent from the operating time of the fading and the exposure at the midpoint of the fade-in and fade-out is made equal while the film speed of the fade-in can be varied from that of the fade-out in order to effect the overlap by adjusting the capacity of the capacitor 12 or the constant current $I_3$, $I_4$ appropriately.

In the above described embodiments of the present invention, when the source voltage Vcc varies, the time $T_1$ and $T_2$ for the fade-out and the fade-in necessarily vary depending upon the variation in the source voltage Vcc, because the constant current is used in charging and discharging the capacitor 12 which is independent from the source voltage Vcc.

As previously described, the times $T_1$ and $T_2$ are given by the following equations:

$$T_1 = Vcc/I_4 (1 - K)C$$

$$T_2 = Vcc/I_3 (1 - K)C$$

Figure 8A:
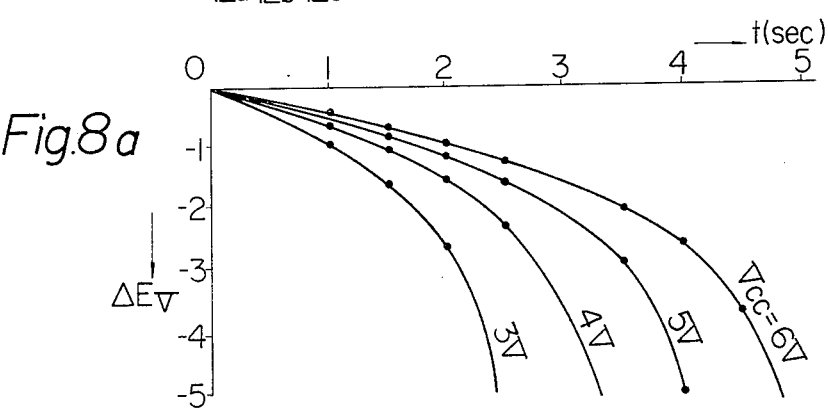
FIGS. 8(a) is a diagram showing the voltage characteristics of the curves showing the variation in intensity of illumination on the film plane during the fade-out when the electric source voltage is varied.
Figure 8B:
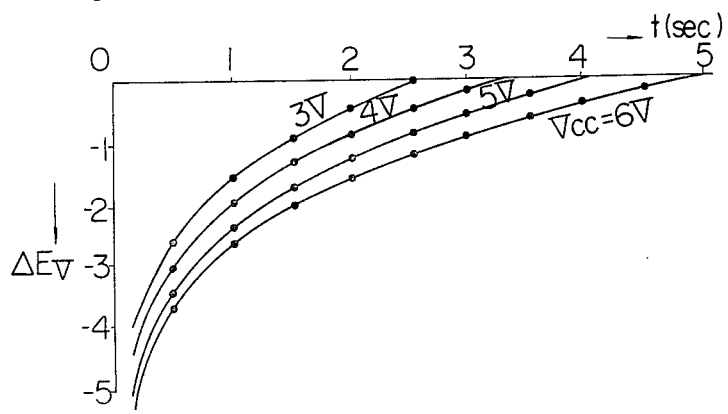
FIG. 8(b) is a diagram showing the voltage characteristics of the curves showing the variation in intensity of illumination on the film plane during the fade-in when the electric source voltage is varied.

As is cleare from the above equations the times $T_1$ and $T_2$ are proportional to the source voltage Vcc. FIGS. 8(a) and 8(b) show the variation in the times $T_1$ and $T_2$.

In a cinecamera having a film feeding mechanism, a cell such as a manganese cell suffering a relatively large variation in voltage is ususally used, therefore, it is desirable to avoid the above described variation in the times $T_1$ and $T_2$ depending upon the variation in the source voltage.

In accordance with the present invention, there is provided a compensating circuit which enables the times $T_1$ and $T_2$ to be independent from the variation in the source voltage Vcc as shown in FIG. 9.

In FIG. 9, the constant current discharging circuit 14 corresponding to that shown in FIG. 2 comprises as shown in FIG. 9 a transistor 18 for conducting the constant current $I_3$, a variable resistor 19 for adjusting the constant current $I_3$, a fixed resistor 20, a transistor 21, a fixed resistor 22 and a fixed resistor 23 forming a voltage divider together with the resistor 22 for biasing the base of the transistor 21, the condition of which controls the transistor 18 for conducting the constant current $I_3$.

In a similar manner, the constant current charging circuit 15 shown in FIG. 9 comprises a transistor 24' for conducting the constant current $I_4$, a variable resistor 25' for adjusting the constant current $I_4$, a fixed resistor 26', a transistor 27', a resistor 28' and a resistor 29' forming a voltage divider together with the resistor 28' for biasing the base of the transistor 27', the condition of which controls the transitor 24' for conducting the constant current $I_4$.

The operation of the constant current discharging circuit 14 for the fade-in will be first described. Assuming that the resistance each of resistors 22', 23', is $R_{22}$, $R_{23}$, then the base voltage of the transistor 21 is expressed by:

$$R_{22}/R_{22} + R_{23} \ Vcc = K_2 \ Vcc$$

where
$K_2 = R_{22}/R_{22} + R_{23}$
The emitter voltage is:

$$K_2 \ Vcc + V_{BE}$$

where $V_{BE}$ is the voltage between the base and the emitter.

The resistance of a resistor 20' and the setting of a variable resistor 19' are so selected that the emitter current of the transistor 21' is sufficiently great in comparision with the base current of a transistor 18'. Then, the collector current of the transistor 18, i.e., the constant discharging current $I_3$ is represented by:

$$I_3 = \frac{K_2 Vcc + V_{BE} - V_{BE}}{R_{19}} h_{FE2} = \frac{K_2 h_{FE2}}{R_{19}} Vcc = K_2'Vcc$$

where $h_{FE2}$ is the D.C. current amplification factor, $R_{19}$ is the resistance of the variable resistor 19', and $K_{2hFE2}/R_{19}$ is K2'.

In the similar manner, the constant charging current $I_4$ is obtained by :

$$I_4 = K_1 \ 'Vcc$$

where $K_1'$ is a coefficient corresponding to $K_2'$.

Therefore, the times $T_1$ and $T_2$ required for the fade-out and fade-in are:

$$T_1 = \frac{Vcc}{I_4} (1 - K)C = \frac{1 - K}{K_1'} C$$

$$T_2 = \frac{Vcc}{I_3} (1 - K)C = \frac{1 - K}{K_2'} C \ .$$

The above equations show that the times $T_1$ and $T_2$ are independent from the source voltage Vcc.

In a cinecamera having an automatic exposure control system including a servomechanism, so-called overshooting, i.e., the excessive movement of the diphragm out of the proper exposure tends to occur due to the time lag of the mechanical portion of the exposure control system and the photoelectric element when the scene brightness varies rapidly. Particularly, when the scene brightness varies rapidly from the low brightness to the high brightness, the diaphragm tends to be completely closed or stopped out so that the light incident to the film is completely intercepted as shown in FIG. 10. In FIG. 10, the solid line in the upper graph indicates where no limiting means is provided while the broken line shows where the limiting means is provided, the ordinate showing the illumination on the film by lux and the abscissa showing the time. In FIG. 10, $E_1$ indicates the illumination at the proper exposure.

In order to avoid the above disadvantage, the conventional cinecamera is normally provided with stop down limiting means for preventing the diaphragm from being completely closed even though rapid change in scene brightness takes place.

However, if such stop down limiting means is provided in the cinecamera, the fade-out can not be terminated in fully closed diaphragm while the fade-in can not be commenced at the completely closed diaphragm, thereby deteriorating the quality of the fading.

Figure 11:
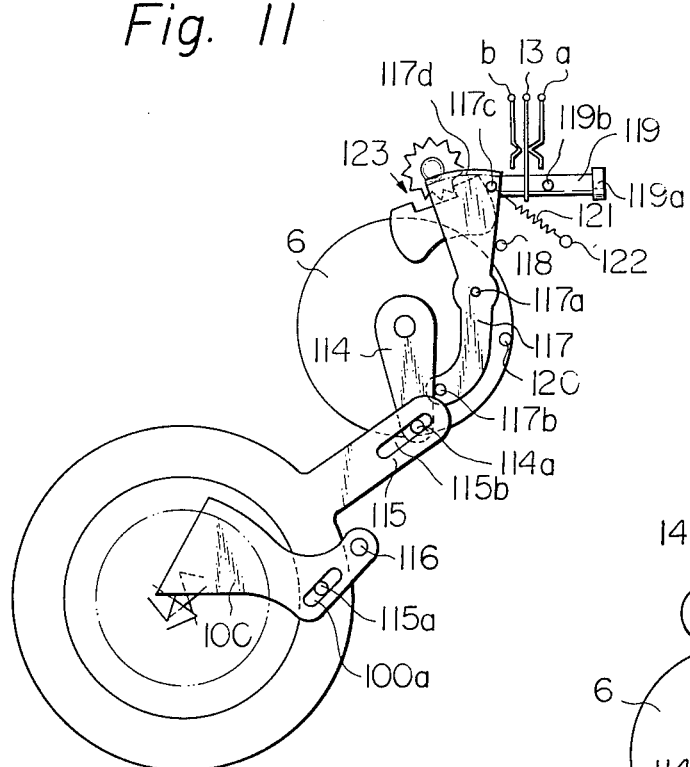
FIG. 11 is a schematic front view showing an embodiment of the present invention for mechanically controlling the stop down limiting means for preventing the excessive movement of the diaphragm.
Figure 12:
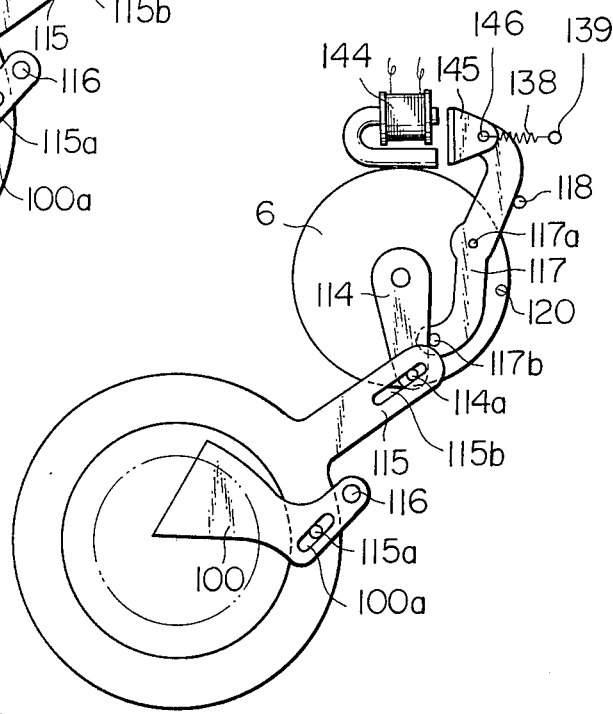
FIG. 12 is a schematic front view showing another embodiment of the present invention for electrically controlling the stop down limiting means.
Figure 13:
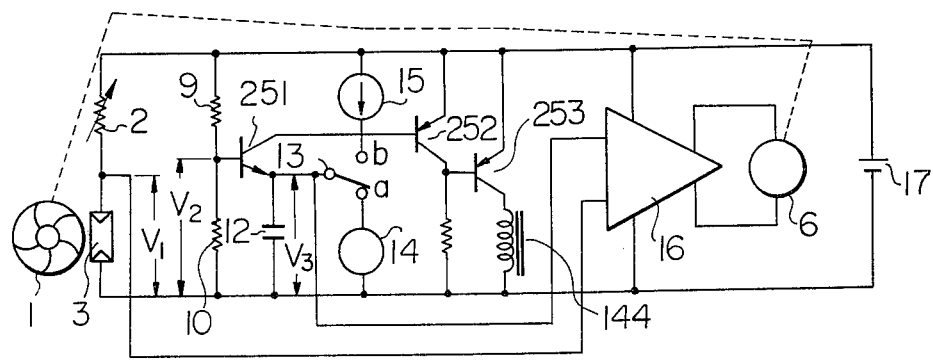
FIG. 13 is a diagram showing the electric circuit for use with the embodiment shown in FIG. 12.

The present invention provides means for releasing the stop down limiting means during the fading operation so as to avoid the above disadvantages in the fading as shown in FIGS. 11 to 13.

FIG. 11 shows an embodiment of the releasing means of the stop down limiting means during the fading which is used with the circuit shown in FIG. 2. The operation of the device in FIG. 11 is similar to those described previously.

As shown in FIG. 11, the servomotor 6 is provided with a motor lever 114 to which a motor lever pin 114a is secured at its distal end. The pin 114a slidably engages with an elongated hole 115b formed in an arm intergral with the diaphragm ring 115 of the diaphragm. Each of diaphragm blades 100 pivoted at pivot pin 116 is provided with an elongated hole 100a in which a pin 115a secured to the diaphragm ring 115 slidably engages. Thus, when the servomotor 6 is actuated in either of the opposite directions by the servoamplifier 16, the diaphragm blades 100 are opened or closed so that the illumination on the film plane and the photoelectric element 3 (not shown in FIG. 11) is regulated for the proper exposure during the normal operation of the cinecamera while the fade-in and fade-out as well as the overlap are effected as previously described.

In order to effect the fade-out and the fade-in, a fade rod 119 having a fade button 119a and a fade pin 119b is slidably arranged adjacent to the upper end of a stopper lever 117 pivotably supported at its intermediate portion thereof by a pin 117a. The stopper lever 117 has a stopper pin 117b at its lower end for arresting the movement of the motor lever 114. A pin 117c is secured to the upper end of the stopper lever 117 adjacent to the inner end of the face rod 119 and a spring 121 is supported at its one end by the pin 117c while the other end is supported by a pin 122 secured to a stationary portion of the device so that the stopper lever 117 is urged in the clockwise direction so as to locate the stopper pin 117b in the arresting position against the motor lever 114, a limiting pin 118 cooperating with the stopper lever 117 so as to maintain the stopper pin 117b in its arresting position.

Another limiting pin 120 is provided so as to limit the anticlockwise rotation of the stopper lever 117. The fade pin 119b is adapted to switch the switch 13 which is normally connected to the contact a from the contact a to the contact b upon actuation of the fade rod 119 toward the left, while the inner end of the rod 119 urges the pin 117c of the stopper lever 117 upon actuation of the rod 119 toward the left so that the stopper lever 117 is rotated in the anticlockwise direction against the action of the spring 121 until the lever 117 abuts against the limiting pin 120. In this position, the stopper pin 117b is moved out of the arresting position to release the motor lever 114. A sector gear 117d is formed at the upper end of the stopper lever 117 which cooperates with delay means, i.e., a governor 123 consisting of anchor escapement device so that the movement of the lever 117 in the clockwise direction is retarded thereby while the anticlockwise movement of the lever 117 is made free. The governor 123 serves to prevent the stopper pin 117b from moving to its arresting position at the beginning of the fade-in as described later.

In operation for the fade-out, the fade rod 119 is first pushed to move it toward the left so as to swing the stopper lever 117 in the anticlockwise direction against the action of the spring 121 until abuts against the limiting pin 120 thereby moving the stopper pin 117b out from its arresting position against the motor lever 114 for releasing the same allowing the diaphragm to be completely closed or stopped out, while, at the same time, the switch 13 is switched from the contact a to the contact b by the fade pin 119b of the fade rod 119 thereby additionally charging the capacitor 12 so as to effect the fade-out in the manner as previously described.

After the fade-out, when the fade rod 119 is released, the stopper lever 117 is swung in the clockwise direction by the action of the spring 121 while the movement thereof is rotarded by the governor 123 and hence, the fade rod 119 is moved toward the right by the lever 117. At the first part of the rightward movement of the rod 119, the switch 13 is switched from the contact b to the contact a thereby effecting the fade-in as previously described. After the fade-in has been completed, the stopper pin 117b is returned to its arresting position by the retarded movement of the lever 117 by the governor 123 thereby insuring that the stopper pin 117b has no influence on the proper operation of the fade-in. Thus, the stopper pin 117b is made effective after the completion of the fade-in to limit the stop down of the diaphragm during the succeeding normal operation of the cinecamera.

FIGS. 12 and 13 show another embodiment of the present invention in which the stop down limiting means is actuated electrically.

The embodiment shown in FIG. 12 is substantially similar to that shown in FIG. 11 except that an actuator or magnetically attractable piece 145 is mounted by a pin 146 on the upper end of the stopper lever 117 which is urged in the clockwise direction by a spring 138 tensioned between the pin 146 and a stationary pin 139 and an electromagnet 144 is arranged ajdacent to the actuator 145 so as to cooperate with the same so as to selectively release the stopper pin 117b during the fading operation.

FIG. 13 shows the electric circuit for use with the device shown in FIG. 12. In FIG. 13, the base-emitter of a transistor 251 is connected between the junction between the resistors 9, 10 and the capacitor 12, the collector of which is connected to the base of a transistor 252 the emitter of which is connected to the plus terminal of the electric source 17 while the collector is connected to the base of a transistor 253 and a resistor which is connected to the minus terminal of the electric source 17. The emitter of the transistor 253 is connected to the plus terminal of the electric source 17 while the collector thereof is connected to one end of the electromagnet 144 the other end of which is connected to the minus terminal of the electric source 17.

In operation, the switch 13 is held connected to the contact a in the normal operation of the cinecamera so that the current lead to the constant current discharging circuit 14 continues to flow through the transistor 251 even after a current for charging the capacitor 12 instantaneously flows through the transistor 251 so that the transistor 252 is held conductive to render the transistor 253 to be nonconductive thereby maintaining the electromagnet in the deenergized state. Thus, the stopper lever 117 is held in the position in which the stopper pin 117b is in the arresting position against the motor lever 114 to limit the stop down of the diaphragm in the normal operation of the cinecamera.

In effecting the fade-out, the switch 13 is switched from the contact $a$ to the contact $b$ so that the capacitor 12 is additionally charged by the constant current charging circuit 15 to raise the output voltage in excess of the reference voltage $v_2$ to the source voltage $Vcc$. Thus, the transistor 251 is rendered to be nonconductive so that the transistor 252 is made nonconductive while the transistor 253 is rendered to be conductive thereby energizing the electromagnet 144 to actuate or attract the actuator 145. Therefore, the lever 117 is swung in the anticlockwise direction to release the stopper pin 117b out from the arresting position, thereby permitting the diaphragm to be completely closed for the proper fading operation.

In the fade-in, the switch 13 is switched from the contact b to the contact a thereby commencing the discharge of the capacitor 12 through the constant current discharging circuit down to the reference voltage $V_2$. Until the voltage of the emitter of the transistor 251 is made lower than the base voltage thereof, the transistor 251 and the transistor 252 are maintained in the nonconductive state and the transistor 253 is held in the conductive state to continuingly attract the actuator 145 so as to release the stopper pin 117b. When the emitter voltage of the transistor 251 reaches the base voltage thereof, the conditions of the transistors 251, 252 are inverted so that the transistor 253 is rendered to be nonconductive thereby deenergizing the electromagnet 144 to restore the stopper pin 117b to its arresting position after the completion of the fade-in so as to prevent the diaphragm from being completely closed during the succeeding normal operation of the cinecamera.

I claim:

1. An improved fade-in and fade-out device of a cinecamera having an automatic exposure control circuit including an electric source (17), a photoelectric element (3) having an output and being arranged behind one of two variable diaphragms (1, 100), namely that of a lens of the cinecamera and that coupled with a diaphragm of the lense, for receiving light from a scene therethrough so as to generate an output voltage indicative of scene brightness, a reference-voltage circuit having a capacitor (12) charged by said electric source so that the output voltage thereof is used as the reference voltage, a servo-amplifier (16) connected with its inputs to said output of the photoelectric element and the output of said capacitor, respectively, so as to continue to generate an output until the output voltages of said photoelectric element and said capacitor are made equal, the polarity of said output of the servo-amplifier being determined depending upon which of said outputs is greater than the other, namely that of said photoelectric element and of said capacitor, and actuating means 6 connected to said output of the servoamplifier and operatively coupled with said variable diaphragm, thereby adjusting the latter of the lens for proper exposure, wherein the improvement comprises a constant-current charging circuit 15 connected to the plus terminal of said electric source and selectively connectable to said capacitor for additionally charging the same with a constant current in excess of said reference voltage so as to increase said output voltage thereof linearly, a constant-current discharging circuit (14) connected to the minus terminal of said electric source and selectively connectable to said capacitor for discharging the same with a constant current so as to decrease said output voltage thereof linearly to said reference voltage, and switching means (13) for alternately connecting said capacitor to one of said charging circuit and said discharging circuit, thereby permitting the fade-in and the fade-out to be effected by said variable diaphragm of the lens.

2. The device as defined in claim 1, wherein said actuating means (6) is a servo-motor.

3. The device as defined in claim 1, further comprising switching means (2, 33, 2a or 2b) for varying the film speed and adjustisng means (34) coupled with said switching means for varying the capacity of said capacitor (12) in inverse proportion to the variation in the film speed, thereby permitting the time required for each fade-in and fade-out during an overlap to be varied in inverse proportion to the variation in the film speed, so that the numbers of frames in the film used in the fade-out and the fade-in in the overlap can be made equal to each other regardless of the film speed during the fade-in and the fade-out.

4. The device as defined in claim 1, further comprising switching means (2, 33, 2a or 2b) for varying the film speed and adjusting means (24, 23) coupled with said switching means for varying the charging current supplied to said capacitor (12) by said charging circuit (15) and the current discharged from said capacitor through said discharging circuit (14) in proportion to the variation in the film speed, thereby permitting the time required for each fade-in and fade-out during an overlap to be varied in inverse porportion to the variation in the film speed, so that the numbers of frames in the film used in the fade-out and the fade-in in the overlap can be made equal to each other regardless of the film speed during the fade-in and the fade-out.

5. The device as defined in claim 1, further comprising adjusting means (25', 19') for varying the current of said charging circuit (15) and said discharging circuit (14) in proportion to the voltage variation of said electric source (17), thereby permitting the time required for the fade-in and the fade-out to be independent from the voltage variation.

6. The device as defined in claim 1, further comprising means (117) for limiting the stop down of said diaphragm (100) of the lens to a predetermined aperture, said limiting means being capable of being released for allowing said diaphragm of the lens to be completely stopped out, and releasing means (121, 123, 144, 145) operatively coupled with said switching means (13) for releasing said limiting means in response to the actuation of said switching means for the fade-in and the fade-out, thereby permitting said diaphragm of the lens to be completely stopped out during the fade-in and the fade-out.

7. The device as defined in claim 6, further comprising means for restoring said limiting means (117) to its limiting position after a predetermined time period after the fade-in has been completed by the actuation of said exposure control circuit as effected by said switching means (13).

8. The device as defined in claim 7, wherein said restoring means includes a mechanical governor (123).

9. The device as defined in claim 7, wherein said restoring means includes an electromagnet (144) and transistor means (251, 252, 253) connected to said capacitor and said electromagnet.

* * * * *